United States Patent
Rodriguez Elizondo et al.

(10) Patent No.: US 8,974,681 B2
(45) Date of Patent: Mar. 10, 2015

(54) METHOD FOR BALANCING A TURBOMACHINE ROTOR

(71) Applicant: SNECMA, Paris (FR)

(72) Inventors: Gabriela Rodriguez Elizondo, Queretaro (MX); Stephane Vitrac, Queretaro (MX); Marcial Suarez Cabrera, Queretaro (MX); Patrick Momier, Queretaro (MX)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/946,642

(22) Filed: Jul. 19, 2013

(65) Prior Publication Data
US 2014/0021056 A1 Jan. 23, 2014

(30) Foreign Application Priority Data
Jul. 19, 2012 (FR) .................................... 12 57011

(51) Int. Cl.
C03C 15/00 (2006.01)
C25D 5/34 (2006.01)
C23F 1/04 (2006.01)
F01D 5/02 (2006.01)
G01M 1/34 (2006.01)

(52) U.S. Cl.
CPC ... C25D 5/34 (2013.01); C23F 1/04 (2013.01); F01D 5/027 (2013.01); G01M 1/34 (2013.01)
USPC .................. 216/34; 216/83; 216/96; 216/100; 216/102; 252/79.1; 29/889.23

(58) Field of Classification Search
USPC ........................ 216/34, 83, 96, 100, 102, 109; 252/79.1–79.4; 29/889.23, 408.08
See application file for complete search history.

(56) References Cited

U.S. PATENT DOCUMENTS

| 8,171,632 B2 * | 5/2012 | Kuehhorn et al. ......... 29/889.23 |
| 8,449,784 B2 * | 5/2013 | Parkos et al. .................... 216/34 |
| 2002/0125215 A1 | 9/2002 | Davis et al. |
| 2004/0045936 A1 | 3/2004 | Davis et al. |

FOREIGN PATENT DOCUMENTS

| EP | 1239059 | * | 2/2002 |
| EP | 1 239 059 A2 | | 9/2002 |
| SU | 455257 | | 12/1974 |

OTHER PUBLICATIONS

French Preliminary Search Report and Written Opinion issued Jun. 11, 2013, in Patent Application No. FR 1257011, filed Jul. 19, 2012 (with English Translation of Category of Cited Documents).

* cited by examiner

*Primary Examiner* — Lan Vinh
*Assistant Examiner* — Maki Angadi
(74) *Attorney, Agent, or Firm* — Oblon, McClelland, Maier & Neustadt, L.L.P.

(57) ABSTRACT

A method for balancing a rotor, notably of a turbomachine, includes a step of determining an unbalancing mass, and a step of balancing by chemical machining of the rotor. The chemical machining includes arranging a bath containing a chemical machining agent so that the bath has a capacity of heterogeneous material removal as a function of the depth in the bath, an amount of material removal at a first depth in the bath is greater than an amount of material removal at a second depth in the bath; immersing the rotor in the bath; and orienting the rotor in the bath taking account of the capacity of heterogeneous material removal so that the quantity of material removed from the rotor in a zone of the unbalancing mass is sufficient to balance the rotor.

6 Claims, 2 Drawing Sheets

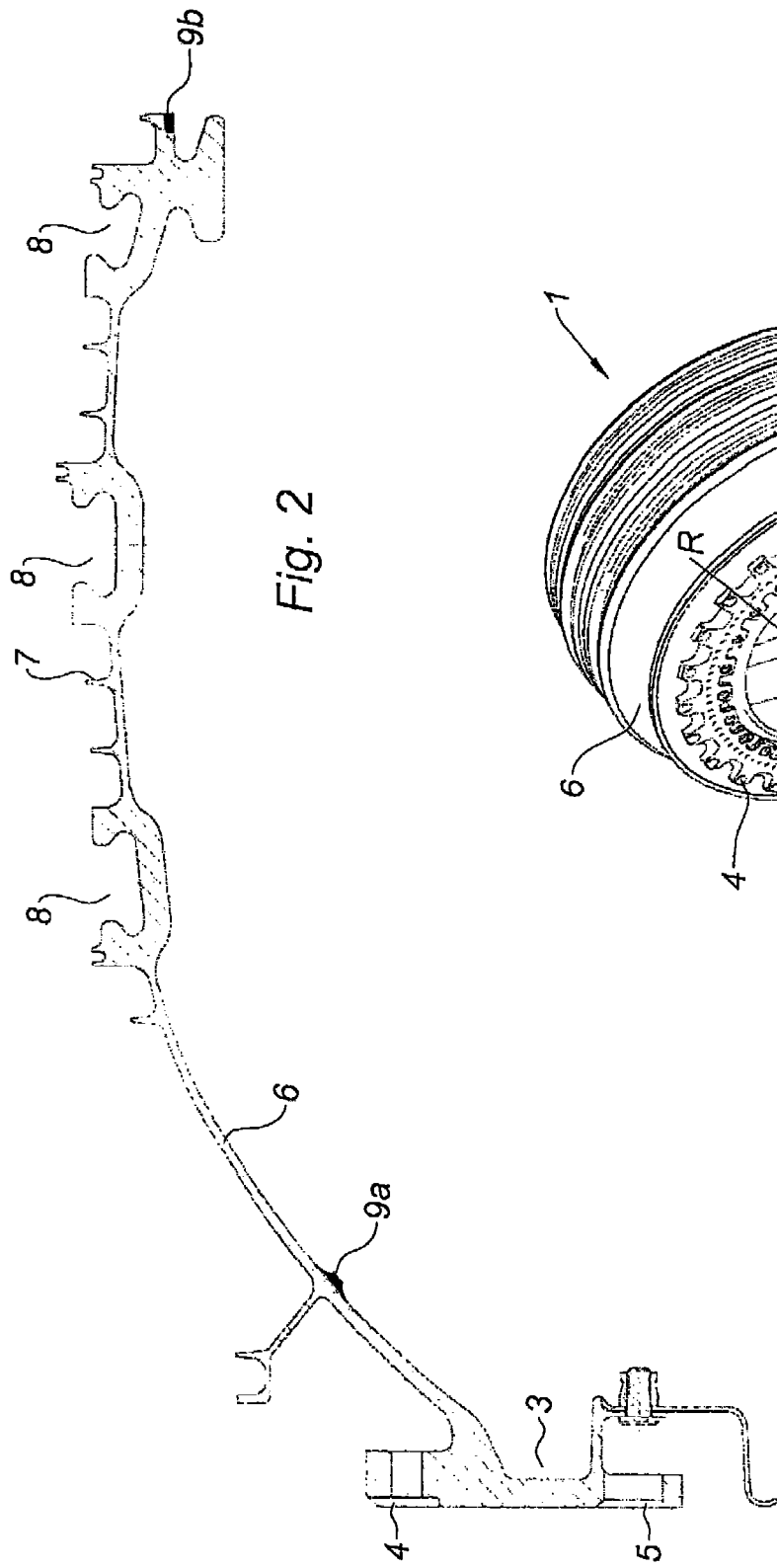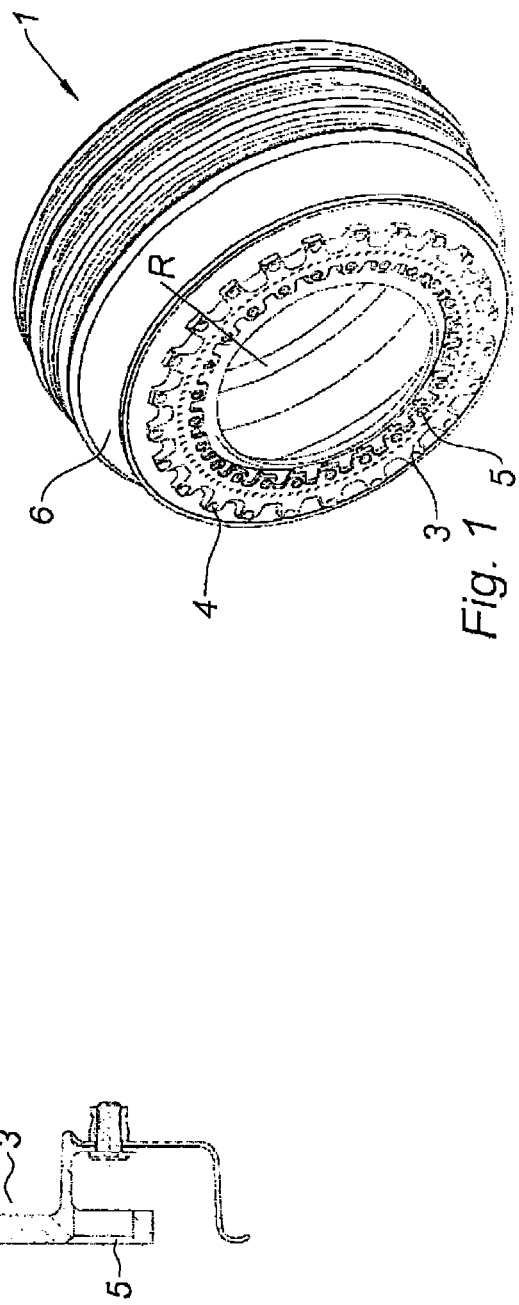

METHOD FOR BALANCING A TURBOMACHINE ROTOR

TECHNICAL FIELD

The present invention relates to the manufacture of rotors and concerns the operations of finishing machining, such as those relating to the dynamic balancing or else to the precise dimensioning of a turbomachine rotor notably of a low-pressure compressor drum of a gas turbine engine.

DESCRIPTION OF THE PRIOR ART

A gas turbine engine, such as a turbojet with front fan, comprises a fan disk and one or more compressor rotors by which the combustion chamber of the latter is fed with air. The compressor rotors comprise a plurality of fins placed in transverse rows and held on the rotor disks either by axial-entry connections, the roots of the fins being engaged in individual slots, that are axial, arranged on the periphery of the rim of the disks, or radial- and tangential-entry connections in a circumferential groove perpendicular to the axis of the rotor. On certain engines, the compressor rotors are formed of a hollow cylindrical part, in the shape of a one-piece drum, supporting at its periphery the rows of fins of the various compression stages.

According to one embodiment, a compressor drum has a thin cylindrical wall with a plurality of transverse grooves forming housings for the fins. The root of the fins is dovetail-shaped and is arranged to be housed in the peripheral groove of the drum. The sides of the groove are curved inwards so as to form bearing surfaces for the roots of the fins capable of withstanding the centrifugal forces during the operation of the engine. The wall is formed to fulfil other functions; it also has radial blades forming the lips of labyrinth seals and orifices for fastening and discharging the mechanical stresses.

The manufacture of such a turbomachine drum, in titanium alloy, comprises the production by forging of elementary parts, rough cast, of revolution in the form of disks, the machining of these parts to obtain semi-finished parts and assembling them mechanically or by welding. At the end of the manufacturing process, the rotor is subjected to various surface treatments and to material soundness inspections and finally to finishing machining operations to obtain a part that is balanced and has dimensions of the required precision.

An operation of finishing machining is designed to rework certain portions of the part on a lathe and on a jig to obtain dimensions inside a required and precise tolerance range; it is aimed notably at the dimensions of the piercings, their diameter in particular, and the balancing of the part.

The operation for the static and dynamic balancing of the rotor is designed to eliminate the unbalancing masses either by adding weights or on the contrary by removing material in predetermined zones. Balancing by machining aims to remove material.

These operations involve flows of parts between various workshops of the manufacturing facility. Finishing machining for the piercing for example involves the return of the parts from the surface-treatment station to a machining workshop. Balancing requires the return of the parts from the station for measuring the unbalancing masses to a turning workshop. These movements are unfavourable in terms of fluidity of the manufacturing process. In addition, since the machines used are dedicated to these operations, this process involves underutilization of machines that are quite costly with a negative impact on profitability.

The applicant has set itself the objective of improving the process for manufacturing rotating parts such as compressor drums, notably low-pressure compressor drums, or else fan disks of turbine engines.

More precisely, it has set itself the objective of finding a technique making it possible both to remove material with precision from such a part while selectively attacking the habitual imbalances on the drums.

BRIEF DESCRIPTION OF THE INVENTION

Such an objective is achieved with a method for balancing a rotor, notably of a turbomachine, comprising a step of determining the unbalancing mass followed by a step of balancing by chemical machining of the rotor.

The advantage of chemical machining is that it makes it possible to achieve the desired result by using the facilities that are in situ without any disruption to the flow of parts between the various workshops. Specifically, the manufacture of the rotating parts requires inspection in order to detect the forging and machining defects. This inspection for parts made of titanium alloy, called "blue etch", comprises several successive steps including an acid attack in a bath of acid salts which is used to remove a thickness of material, of the order of a few microns, an anodic oxidation in a trisodium phosphate bath, the part being in the anode position, so as to deposit on the latter a thickness of material of a few microns and a visualization by partial attack in a nitric-hydrofluoric bath which allows the defects of the part—segregations, inclusions, porosities, cracks, incrustations, heterogeneities, etc.—to appear in shapes and colours that are specific to them.

Patent EP 518 766 in the name of the applicant gives an example of an acid-attack bath for titanium alloys, which bath is nitric-acid based and hydrofluoric-acid based.

Using the acid attack to selectively machine the part simplifies the manufacturing method. The benefit is the great precision of the method and its repeatability; it avoids making use of costly machines.

According to one embodiment, the chemical machining comprises the immersion of the rotor in a bath containing a chemical machining agent, the bath being arranged so as to have a capacity of removal of material that is slightly heterogeneous. The removal of material is dependent on the depth in the bath and the relative position of the part with respect to the means used to stir the latter. The rotor is oriented in the bath taking account of the said capacity of heterogeneous removal of material so that the quantity of material removed from the rotor in the zone of the unbalancing mass is sufficient to balance the rotor nevertheless without departing from the dimensional tolerances of the part.

Thus, with the invention, a property of non-homogeneous attack of the acid bath is used to remove the material in a different manner depending on the zone on the rotor. Specifically, the elimination of the unbalancing mass consists in removing material from the rotor in the zone where there is additional weight. It is sufficient to cause the zones where the material must be removed to coincide with the portions of the bath that are more active. The bath attack is homogeneous relative to the dimensional precision required for the parts while being heterogeneous relative to the quantity of material that must be removed to provide the balancing.

Patent FR 2 961 598 in the name of the applicant describes a technique of acid attack with means of homogenization of the bath.

In order to apply the method in practice, when the direction of the unbalancing mass has been identified on the rotor by means of a mark, the rotor is attached to a handling tool and suspended so that the mark identified on the rotor is oriented in a vertical plane, then the rotor is conveyed and submerged in the said chemical machining baths.

According to another feature of the method, the rotor is kept in the chemical machining bath for a sufficient period to remove a minimum quantity of material from the whole rotor.

Thus, while a selective machining of the balancing zones is carried out, a general machining is made possible to bring the dimensions to the desired values with a very small tolerance range.

Finally, to the extent that a material soundness inspection is necessary, it is possible advantageously to include the treatment of material removal by chemical machining in the "blue etch" method according to which, after chemical machining, the rotor is treated by anodization.

BRIEF DESCRIPTION OF THE FIGURES

Other features and advantages will emerge from the following description of a non-limiting embodiment of the invention, with reference to the appended drawings in which:

FIG. 1 is a view in perspective of a low-pressure compressor drum to which the method of the invention is applied;

FIG. 2 is a view in axial half section of the rotor of FIG. 1;

DETAILED DESCRIPTION OF AN EMBODIMENT OF THE INVENTION

Figure 3:
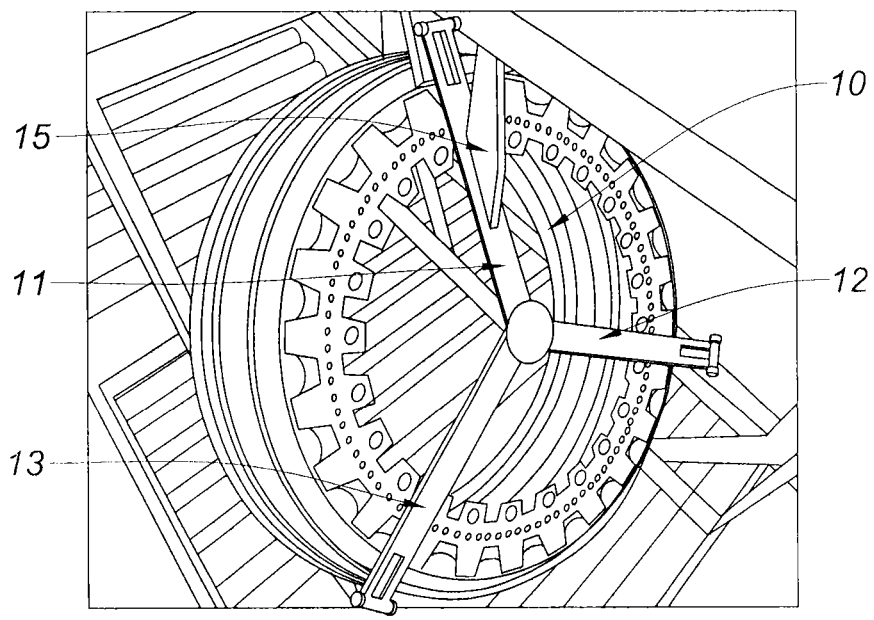
FIG. 3 shows an example of mounting the drum of FIG. 1 on a suspension tool.
Figure 4:
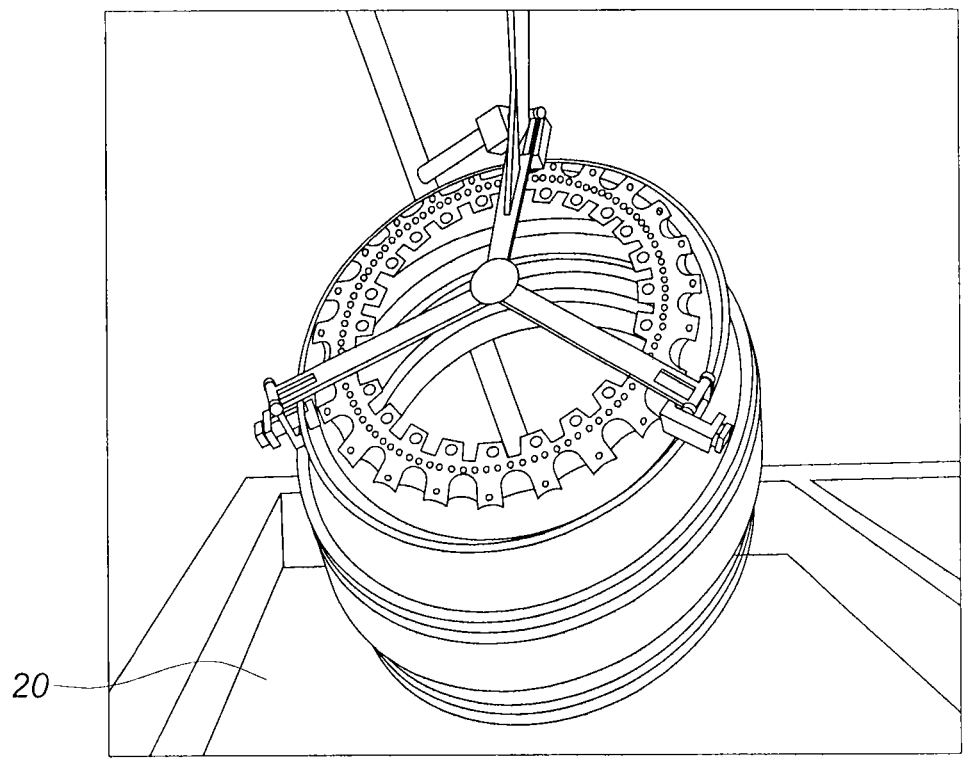
FIG. 4 shows the drum above a treatment bath.

FIGS. 1 and 2 show an example of a low-pressure compressor drum 1, known as a booster drum, of a front-fan bypass turbojet. It is a cylindrical part made of titanium alloy.

It shows upstream, to the left of the figure, the radial flange 3 for fastening to the fan disk, which is not shown. The flange is festooned with fastening orifices 4. The flange also comprises orifices 5 for relieving mechanical stresses. The wall 6 downstream of the flange is as thin as possible with transverse blades 7 which extend radially on the outer face of the wall. These blades form the lips of a labyrinth seal and are arranged to interact with an abradable material secured to the stator portion opposite. Circumferential grooves 8 are machined in the annular thicknesses of the wall. These grooves have a dovetail section and are arranged to form housings for roots of compressor fins not shown. This compressor drum has three compression stages. The materials, titanium alloy, and the geometry of the wall of the drum are chosen to withstand the centrifugal forces during the operation of the engine, the drum being as light as possible.

The steps for manufacturing the drum comprise, at the end of the manufacturing procedure, the balancing of the part. This is done according to the prior art by using two balancing fillets shown at 9a and 9b, which are annular, one upstream and the other on the downstream side of the drum. After having determined the orientation of the unbalancing mass and the value of the balancing moment, an eccentric bore relative to the axis of the rotor is machined by turning. The value of the eccentricity of each machining of the fillets 9a and 9b and the quantity of material removed are determined by a move to the balancing stand. A description of a way of balancing according to this method is described in patent EP-B1-1 88 900.

Using the invention avoids the mechanical machining of the fillets. Since the latter become superfluous they can be removed.

As in the prior art described above, the unbalancing mass to be corrected is determined by moving the drum to the balancing stand, but, this time, this measurement is taken after machining of the part and not at the end of the manufacturing procedure.

The direction of the unbalancing mass is plotted by a mark on the flange of the drum as can be seen with the mark R in FIG. 1. The suspension tool 10 that can be seen in FIG. 3 is then put in place. The tool 10 comprises three branches 11, 12 and 13 that are placed in star formation and are bolted to the fastening orifices of the flange. It can be seen that the branch 11 comprising the hook 15 for fastening to a gantry crane is mounted so as to be parallel to the direction of the mark indicating the unbalancing mass. Once the latter is fastened to the tool 10, the drum is appropriately cleaned and degreased. The drum is then lifted and placed above an acid bath 20. This bath is, for example, nitric-acid and hydrofluoric-acid based. When the drum has been suspended from the hook 15, it takes the position corresponding to the direction of the unbalancing mass, which is vertical.

The drum is lowered into the bath and is held there for a determined period, calculated as a function of the quantity of material that it is desired to remove. By reason of the heterogeneity of the capacity of attack of the bath, the removal of material has a certain heterogeneity, one zone of the drum surface will be attacked to a greater depth than the rest. It is precisely that which it is desired to machine. The desired removal of material is of the order of 5 to 15 microns, preferably around 10 µm+2 µm. The heterogeneity of the bath is kept at a value below 5 µm. In particular, for the requirement of drum-balancing machining, a certain heterogeneity is maintained so as to cause a removal of material of ±2 µm from the surface as a function of the position between the various zones of the bath. Notably, there is greater removal in the top portion of the baths, the gradient of heterogeneity and hence of removal of material being a function of the position depth-wise in the bath.

It should be noted that the parameters of inclination of the part in the bath, the treatment time and the characteristics of the bath are determined for each type of part.

The invention claimed is:
1. A method for balancing a rotor, notably of a turbomachine, comprising:
    determining an unbalancing mass and
    chemical machining of the rotor, the chemical machining including
        arranging a bath containing a chemical machining agent so that the bath has a capacity of heterogeneous material removal as a function of the depth in the bath, an amount of material removal at a first depth in the bath being greater than an amount of material removal at a second depth in the bath,
    immersing the rotor in the bath, and
    orienting the rotor in the bath taking account of the capacity of heterogeneous material removal so that the quantity of material removed from the rotor in a zone of the unbalancing mass is sufficient to balance the rotor.
2. The method according to claim 1, further comprising:
    identifying the direction of the unbalancing mass by a mark on the rotor;
    attaching the rotor to a handling tool; and
    suspending the rotor so that the mark is oriented in a vertical plane, then conveying the rotor and submerging the rotor in the chemical machining bath.

3. The method according to claim 2, further comprising:
  keeping the rotor in the bath for a sufficient period to remove a minimum quantity of material from the whole rotor.

4. The method according to claim 1, wherein the chemical bath is nitric-acid based and hydrofluoric-acid based.

5. The method according to claim 4, further comprising:
  treating the rotor by anodization after the chemical machining.

6. The method according to claim 1, wherein the capacity of heterogeneous material removal is such that there is a greater removal of material in a top portion of the bath as compared to a lower portion of the bath.

* * * * *